United States Patent
Moertle et al.

(10) Patent No.: US 7,086,232 B2
(45) Date of Patent: Aug. 8, 2006

(54) MULTIHOLE PATCH FOR COMBUSTOR LINER OF A GAS TURBINE ENGINE

(75) Inventors: George Eric Moertle, Cincinnati, OH (US); Bruce Ernest Mills, Goshen, OH (US); James Patrick Holmes, Loveland, OH (US); David Albin Lind, Mason, OH (US); Tariz Kay Harris, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 10/134,283

(22) Filed: Apr. 29, 2002

(65) Prior Publication Data

US 2003/0200752 A1 Oct. 30, 2003

(51) Int. Cl.
*F02C 1/00* (2006.01)
*F02G 3/00* (2006.01)

(52) U.S. Cl. .......................................... 60/752; 60/754
(58) Field of Classification Search .................. 60/752, 60/754, 755, 756, 757
See application file for complete search history.

(56) References Cited

U.S. PATENT DOCUMENTS

| | | | |
|---|---|---|---|
| 4,733,538 A * | 3/1988 | Vdoviak et al. ............... 60/752 |
| 4,833,881 A | 5/1989 | Vdoviak et al. ............... 60/261 |
| 4,896,510 A * | 1/1990 | Foltz ............................. 60/757 |
| 5,181,379 A | 1/1993 | Wakeman et al. ............ 60/261 |
| 5,209,067 A * | 5/1993 | Barbier et al. ................ 60/757 |
| 5,233,828 A | 8/1993 | Napoli ......................... 60/261 |
| 5,241,827 A | 9/1993 | Lampes ........................ 60/754 |
| 5,279,127 A | 1/1994 | Napoli ......................... 60/754 |
| 5,363,654 A | 11/1994 | Lee ............................... 60/752 |
| 5,460,002 A | 10/1995 | Correa .......................... 60/723 |
| 5,465,572 A | 11/1995 | Nicoll et al. .................. 60/266 |
| 5,483,794 A | 1/1996 | Nicoll et al. .................. 60/261 |
| 6,205,789 B1 | 3/2001 | Patterson et al. ............. 60/754 |
| 6,260,359 B1 * | 7/2001 | Monty et al. ................. 60/752 |
| 6,266,961 B1 * | 7/2001 | Howell et al. ................ 60/752 |
| 6,434,821 B1 * | 8/2002 | Nelson et al. ........... 29/888.01 |
| 6,543,233 B1 * | 4/2003 | Young et al. ................. 60/752 |
| 6,546,731 B1 * | 4/2003 | Alkabie et al. ............... 60/754 |
| 6,553,767 B1 * | 4/2003 | Farmer et al. ................ 60/752 |
| 6,655,146 B1 * | 12/2003 | Kutter et al. ................. 60/752 |
| 2002/0073711 A1* | 6/2002 | Hagle et al. .................. 60/772 |

* cited by examiner

*Primary Examiner*—William H. Rodriguez
(74) *Attorney, Agent, or Firm*—William Scott Andes; James P. Davidson, Esq.

(57) ABSTRACT

A liner for a combustor of a gas turbine engine, including a shell having a first end adjacent to an upstream end of the combustor and a second end adjacent to a downstream end of the combustor, wherein at least one discrete region is subject to distress from impingement of hot gases, a plurality of cooling slots formed in the shell through which air flows for providing a cooling film along a hot side of the shell, and a group of cooling holes formed in the shell in the discrete region to augment the cooling film and provide convective bore cooling to the discrete region.

22 Claims, 4 Drawing Sheets

MULTIHOLE PATCH FOR COMBUSTOR LINER OF A GAS TURBINE ENGINE

BACKGROUND OF THE INVENTION

The present invention relates generally to film cooled combustor liners for use in a gas turbine engine and, in particular, to such combustor liners including a multihole patch of cooling holes formed in regions thereof which experience an undesirable thermal gradient.

Combustor liners are generally used in the combustion section of a gas turbine engine located between the compressor and turbine sections of the engine, although such liners may also be used in the exhaust sections of aircraft engines that employ augmenters. Combustors generally include an exterior casing and an interior combustor where fuel is burned to produce a hot gas at an intensely high temperature (e.g., 3000° F. or even higher). To prevent this intense heat from damaging the combustor case and the surrounding engine before it exits to a turbine, a heat shield or combustor liner is provided in the interior of the combustor.

Various liner designs have been disclosed in the art having different types of cooling schemes. One example of liner design includes a plurality of cooling slots formed therein by a plurality of cooling nuggets or the like (e.g., U.S. Patent), where a film of cooling air is provided along the hot side of the liner. Another liner design has been developed, as disclosed in U.S. Pat. No. 5,181,379 to Wakeman et al., U.S. Pat. No. 5,233,828 to Napoli, and U.S. Pat. No. 5,465,572 to Nicoll et al., where a plurality of cooling holes have been formed in an annular one-piece liner to provide film cooling along the hot side of the liner. Further, a combination of multihole cooling and slot-type cooling has been described in U.S. Pat. No. 5,483,794 to Nicoll et al., U.S. Pat. No. 5,279,127 to Napoli, U.S. Pat. No. 5,465,572 to Nicoll et al., and U.S. Pat. No. 4,833,881 to Vdoviak et al.

Each of the aforementioned patents is primarily concerned with various ways in which to provide the desired cooling film for the liner while oftentimes attempting to minimize the amount of cooling air required therefor. Thus, the designs incorporating both multihole cooling and slot cooling involve a distinct separation (i.e., where the slot cooling is utilized in only a first or upstream portion of the liner and the multihole cooling is utilized in only a second or downstream portion of the liner as in the '881 patent), a single cooling slot being provided at an upstream end of the liner in order to assist in starting the cooling film of an otherwise multihole cooled liner as in the '127 patent, or a plurality of spaced cooling slots being provided upstream of separate multihole patterns extending circumferentially around the liner as in the '572 and '794 patents. None of these patents, however, disclose the use of discrete patches of multiholes being provided to augment the cooling film provided by cooling slots on nuggeted liners.

It will also be noted that U.S. Pat. No. 6,205,789 to Patterson et al. discloses a multihole film cooled combustor liner which includes a first group of cooling holes generally disposed therein and a second group of more densely spaced cooling holes incorporated with the first cooling hole group. This second group of cooling holes is provided at various locations of the liner where the cooling film is degraded, such as those regions subjected to swirl impingement or located immediately downstream of a large opening. While the second cooling hole group is defined within certain regions, it must be compatible with the first cooling hole group by maintaining consistent axial spacing and hole size. This limits the flexibility of the pattern to address the specific thermal gradients experienced by the liner.

It will be appreciated that an exemplary double annular combustor includes what is known as a co-rotating, no venturi (CONOVEN) swirler in the main dome. While this combustor is able to minimize emissions, it has been found that an extraordinary amount of hot gases impinge on the inner liner thereof. Such hot gas impingement has been found to produce early oxidation of the forward liner panels, which results in reduced life and combustor burn through in severe cases. In order to solve this problem, additional air is required to cool the distressed panel. Additional cooling flow has been gained in machined slot liners by increasing the size and/or number of the cooling holes feeding the cooling slot. This method has been effective in those cases where there is sufficient space to drill the required number/size of the holes for decreasing the panel temperature to an acceptable level, but the required space is not available in every instance.

Thus, it would be desirable for a combustor liner to be developed for use with a gas turbine engine combustor which provides additional cooling in discrete regions of the liner as required by the thermal gradients experienced. It would also be desirable for such multihole cooling patches to be utilized with liners having either slot cooling or multihole cooling.

BRIEF SUMMARY OF THE INVENTION

In a first exemplary embodiment of the invention, a liner for a combustor of a gas turbine engine is disclosed as including a shell having a first end adjacent to an upstream end of the combustor and a second end adjacent to a downstream end of the combustor, wherein at least one discrete region is subject to distress from impingement of hot gases, a plurality of cooling slots formed in the shell through which air flows for providing a cooling film along a hot side of the shell, and a group of cooling holes formed in the shell in the discrete region to augment the cooling film and provide convective bore cooling to the region.

In a second exemplary embodiment of the invention, a liner for a combustor of a gas turbine engine is disclosed as including a shell having a first end adjacent to an upstream end of the combustor and a second end adjacent to a downstream end of the combustor, wherein at least one discrete region is subject to distress from impingement of hot gases, a plurality of first cooling holes formed in the shell through which air flows for providing a cooling film along a hot side of the shell, and a group of second cooling holes formed in the shell in the discrete region to augment the cooling film and provide convective cooling to the region, wherein the second cooling holes are formed as a plurality of rows from an upstream row to a downstream row so that cooling holes in the downstream row are greater in size than cooling holes in the other rows.

DETAILED DESCRIPTION OF THE INVENTION

Figure 1:
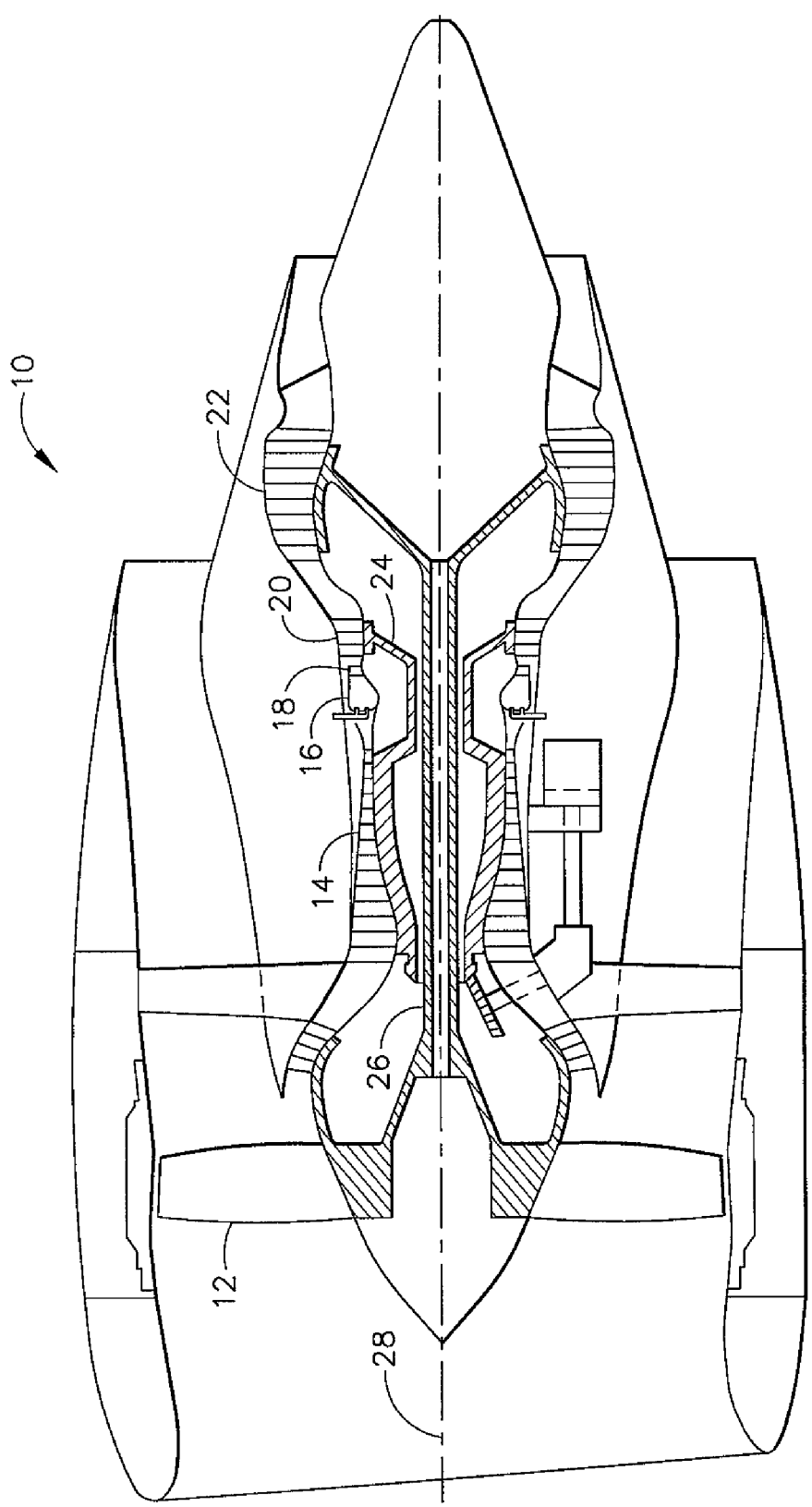
FIG. 1 is a cross-sectional view of a gas turbine engine including a combustor liner in accordance with the present invention.

Referring now to the drawings in detail, wherein identical numerals indicate the same elements throughout the figures, FIG. 1 depicts an exemplary gas turbine engine 10 having in serial flow communication a fan 12, a high pressure compressor 14, and a combustor 16. Combustor 16 conventionally generates combustion gases that are discharged therefrom through a high pressure turbine nozzle assembly 18, from which the combustion gases are channeled to a conventional high pressure turbine 20 and, in turn, to a conventional low pressure turbine 22. High pressure turbine 20 drives high pressure compressor 14 through a suitable shaft 24, while low pressure turbine 22 drives fan 12 through another suitable shaft 26, all disposed coaxially about a longitudinal or axial centerline axis 28.

Figure 2:
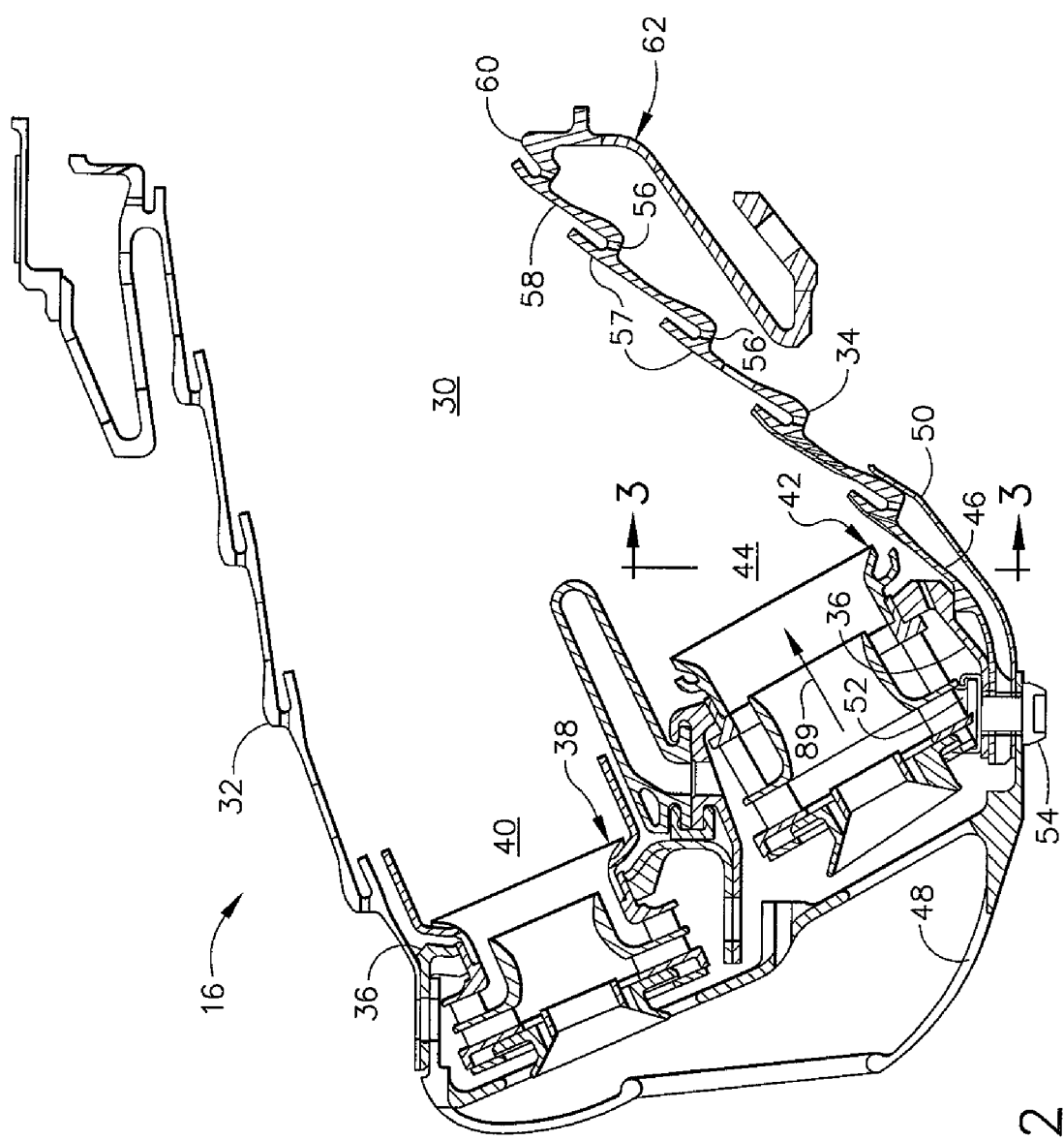
FIG. 2 is an enlarged, cross-sectional view of the combustor depicted in FIG. 1.

As seen in FIG. 2, combustor 16 further includes a combustion chamber 30 defined by an outer liner 32, an inner liner 34, and a dome 36 located at an upstream end thereof. It will be seen that a first fuel/air mixer 38 is located within an outer dome 40 and a second fuel/air mixer 42 is located within an inner dome 44 so as to introduce a mixture of fuel and air therein as desired. The mixture of fuel and air is then ignited by an igniter (not shown) and combustion gases are formed which are utilized to drive high pressure turbine 20 and low pressure turbine 22, respectively. Although a double annular combustor is depicted for exemplary purposes, inner liner 34 of the present invention is equally applicable to any type of combustor, including single annular combustors, which utilizes slot cooling.

Figure 3:
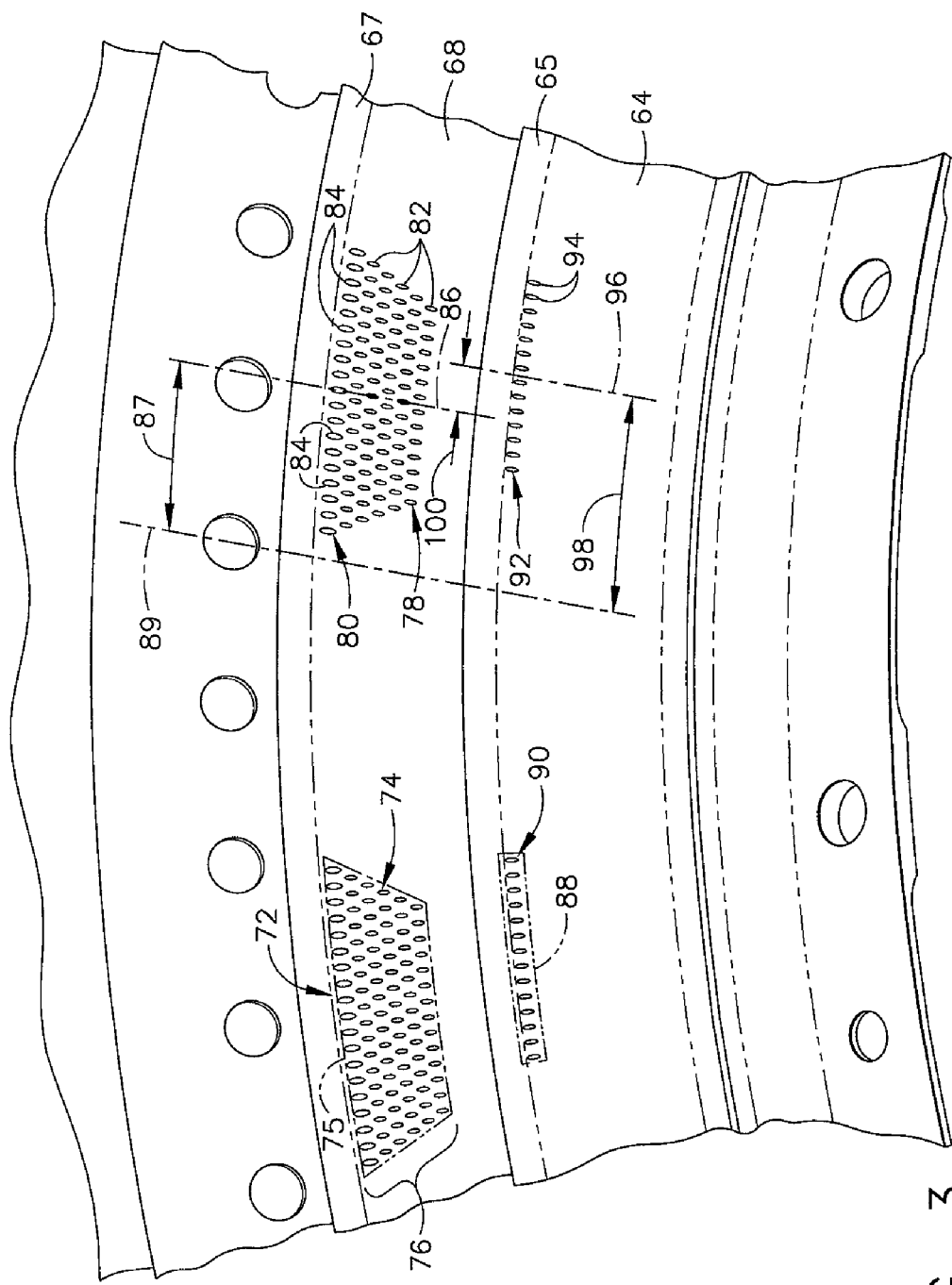
FIG. 3 is a partial top view of the inner liner depicted in FIGS. 1 and 2.
Figure 4:
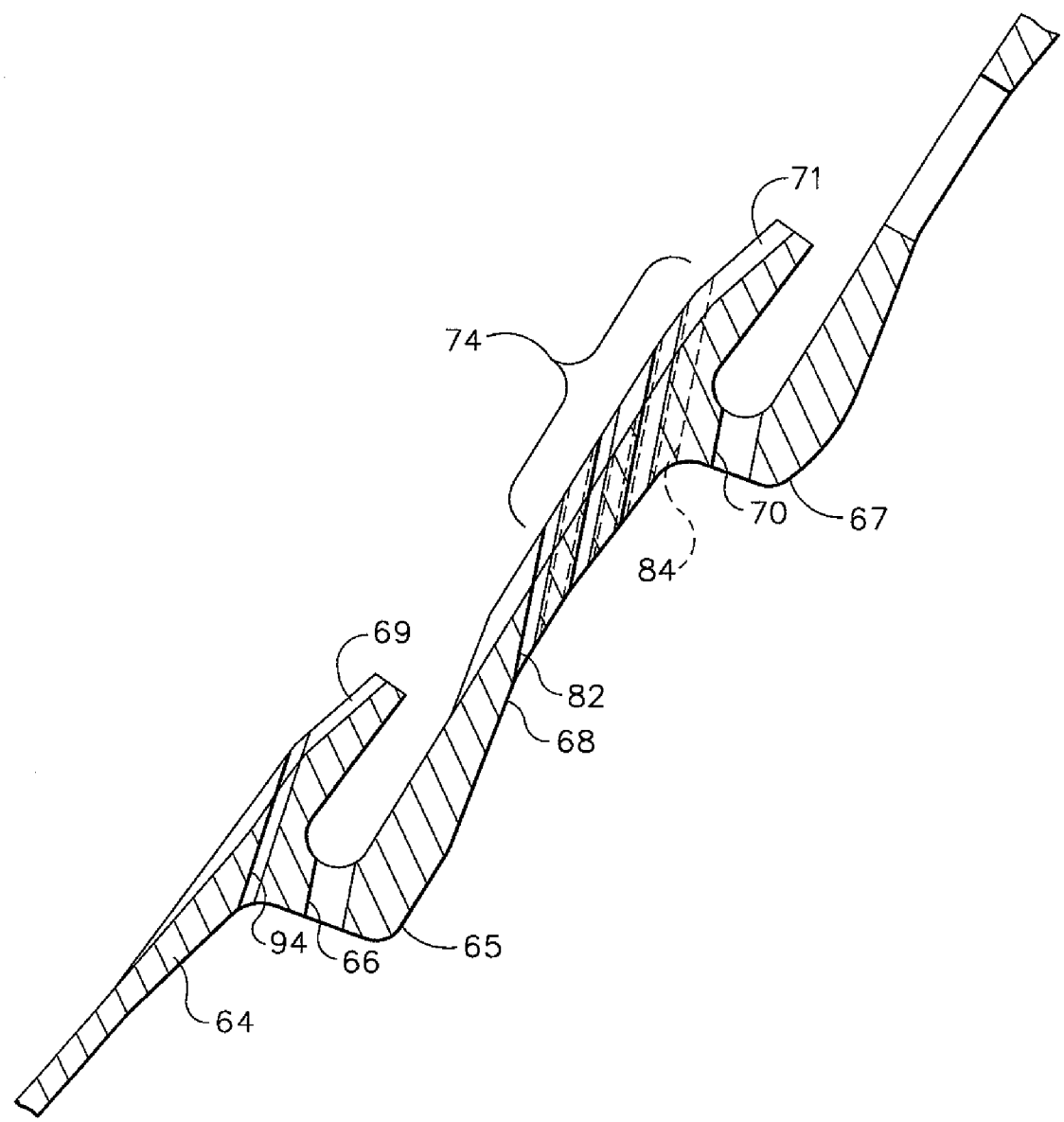
FIG. 4 is a partial sectional view of the inner liner for the combustor depicted in FIGS. 1–3, wherein a multihole patch of cooling holes in accordance with the present invention is shown.

In accordance with the present invention, it will be noted from FIGS. 3 and 4 that inner liner 34 is preferably annular in shape. More specifically, inner liner 34 includes a first end 46 located adjacent to an upstream end of combustor 16, where first end 46 is connected to a cowl 48 and dome 36 via a mechanical connection such as bolt 52 and nut 54, a welded connection, or other similar form of attachment. A heat shield 50 may also be connected to cowl 48, dome 36 and inner liner 34. It will be seen that heat shield 50 extends downstream and radially to the inside of an upstream portion of inner liner 34. A plurality of cooling slots 56 are preferably provided in inner liner 34, such as by individual nuggets 57, to promote a cooling film along a hot side 58 of inner liner 34. Inner liner 34 also includes a second end 60 located adjacent to a downstream end of combustor 16, where second end 60 is preferably connected to a seal assembly 62. In this way, inner liner 34 is able to move axially in accordance with any thermal growth and/or pressure fluctuations experienced.

It will be understood that the area of inner liner 34 between adjacent nuggets 57 are known as panels, where panel 0 (identified by reference numeral 64) is located upstream of a first or upstream nugget 65 and a cooling slot 66 provided therein, panel 1 (identified by reference numeral 68) is located between first nugget 65 and a second nugget 67 (having a cooling slot 70 formed therein) located adjacent thereto, and so forth.

Thermal barrier coatings 69 and 71 are applied to panels 64 and 68 to assist in overcoming impingement of hot gases, but it has been found that certain discrete regions or areas 72 on inner liner 34 are still subject to distress from oxidation and result in reduced life or potential burn through. Accordingly, the present invention includes a group of cooling holes, otherwise known herein as a multihole patch and identified collectively by reference numeral 74, formed in inner liner 34 at discrete region 72 to augment the cooling film and provide convective bore cooling to discrete region 72. It is preferred that cooling hole group 74 be formed in a pattern (as defined by a dotted boundary 75) approximating a thermal gradient pattern experienced by inner liner 34. As seen in FIG. 3, pattern 75 is substantially a trapezoid, where cooling hole group 74 includes a plurality of rows 76 from an upstream row 78 to a downstream row 80.

It will be understood that each cooling hole of group 74 preferably has a size in a range of approximately 0.015–0.035 of an inch. Further, it is preferred that the size of cooling holes 84 in downstream row 80 be larger than cooling holes 82 in the other rows. It is even more preferred that the size of cooling holes 82 get progressively larger from upstream row 78 to downstream row 80. Likewise, cooling holes 82 and 84 preferably have the greatest size adjacent to a centerline 86 extending through cooling hole group 74 and progressively decreases in size as each row extends circumferentially therefrom.

Regarding the spacing of cooling holes 82 and 84 in multihole patch 74, it is preferred that the rows be staggered circumferentially as seen in FIG. 3. Moreover, such cooling holes are preferably spaced in both the axial and circumferential direction in an amount equal to about 4.0 hole diameters. Since the diameter of cooling holes 82 are approximately 0.015–.025 of an inch and cooling holes 84 are approximately 0.025–.035 of an inch, the range of spacing is approximately 3.0–4.0 diameters. As with other multihole cooling arrangements, cooling holes 82 and 84 are preferably oriented at an incidence angle of about 15–25° with respect to inner liner 34.

Due to the swirl being applied by second fuel/air mixer 42, it has been found that one such discrete region 72 where multihole patch 74 would be desirable is located on panel 68 immediately upstream of second cooling nugget 67 with centerline 86 offset a predetermined amount 87 from a centerline 89 through each fuel/air mixer 42 of combustor 16. Since there are a plurality of fuel/air mixers 42 provided circumferentially about longitudinal axis 28, a multihole patch 74 is preferably positioned at a location adjacent each such fuel/air mixer 42 having approximately the same amount of offset 87 as described above.

A second discrete region 88 where a multihole patch 90 having a second configuration has been found to be desirable is in panel 64 upstream of first nugget 65. In order to improve the overhang temperature of cooling nugget 65, a row 92 of cooling holes 94 is preferably located in second discrete region 88, where a centerline 96 through row 92 is offset from both centerline 89 through each fuel/air mixer 42 and centerline 86 of multihole patch 74 by predetermined amounts 98 and 100, respectively. It will be appreciated that while the size of cooling holes 94 may have approximately the same size throughout row 92, it would be preferable if the size thereof was greatest along centerline 96 and decreased as cooling holes 94 extended circumferentially therefrom. It will also be noted that second discrete region 88, and thus row 92 of cooling holes 94, preferably extends only partially between adjacent cups of combustor 16.

Having shown and described the preferred embodiment of the present invention, further adaptations of inner liner 34 for combustor 16 can be accomplished by appropriate modifications by one of ordinary skill in the art without departing from the scope of the invention. In particular, it will be understood that the concepts described and claimed herein with respect to a slot cooled liner could be utilized in a liner having multihole cooling and still be compatible with the present invention. Further, the multihole patch of the present invention could be applied with respect to other discrete regions of distress on inner liner 34, as well as to discrete regions of distress identified on outer liner 32.

What is claimed is:

1. An inner liner for a combustor of a gas turbine engine, comprising:
   (a) a shell having a first end adjacent to an upstream end of said combustor and a second end adjacent to a downstream end of said combustor, wherein a discrete region thereof is subject to distress from impingement of hot gases;
   (b) a plurality of cooling slots formed in and substantially uniformly spaced along said shell through which air flows for providing a cooling film along a hot side of said shall, said discrete region being located between a first cooling slot and a second cooling slot positioned adjacent thereto; and
   (c) a group of cooling holes formed in said shell at said discrete region to augment said cooling film and provide convective bore cooling to said discrete region.

2. The liner of claim 1, wherein said group of cooling holes is formed in a pattern approximating a thermal gradient pattern experienced by said liner.

3. The liner of claim 2, wherein said pattern is substantially shaped as a trapezoid.

4. The liner of claim 2, said pattern being formed as a plurality of rows from an upstream row to a downstream row, said rows extending only partially around said liner in a circumferential direction.

5. The liner of claim 4, wherein cooling holes in said downstream row we greater in size than cooling holes in said other rows.

6. The liner of claim 4, wherein said cooling holes increase in size from said upstream row to said downstream row.

7. The liner of claim 4, wherein said cooling holes decrease in size from a centerline through said pattern circumferentially therefrom.

8. The liner of claim 4, wherein said rows are staggered circumferentially.

9. The liner of claim 1, wherein spacing between said cooling holes in a circumferential direction is equal to about 3.0–4.0 hole diameters.

10. The liner of claim 1, wherein spacing between said cooling holes in an axial direction is equal to about 3.0–4.0 hole diameters.

11. The liner of claim 1, wherein a centerline through said group of cooling holes is offset circumferentially from a centerline through a fuel/air mixer of said combustor by a predetermined amount.

12. The liner of claim 1, wherein said cooling holes are formed at an incidence angle with mid shell of about 15–25°.

13. The liner of claim 1, wherein maid first and second cooling slots are located adjacent said first end of said shell.

14. An inner liner for a combustor of a gas turbine engine, comprising:
   (a) a shell having a first end adjacent to an upstream end of said combustor and a second end adjacent to a downstream end of said combustor, wherein a discrete region thereof is subject to distress from impingement of hot gases;
   (b) a plurality of cooling slots formed in said shell through which air flows for providing a cooling film along a hot side of said shell, wherein said discrete region is located immediately upstream of a first cooling slot located adjacent said first shell end; and
   (c) a group of cooling holes firmed in said shell at said discrete region to in order to improve an overhang temperature of said first cooling slot.

15. The liner of claim 14, wherein said group of cooling holes is formed as a single row of spaced cooling holes extending partially between adjacent fuel/air mixers of said combustor.

16. The liner of claim 14, wherein said cooling holes are oriented substantially parallel to said first cooling slot.

17. A liner for a combustor of a gas turbine engine, comprising:
   (a) a shell having a first end adjacent to an upstream end of said combustor and a second end adjacent to a downstream end of said combustor, wherein at least one discrete region is subject to distress from impingement of hot gases;
   (b) a plurality of first cooling holes formed in said shell through which air flows for providing a cooling film along a hot side of said shell; and
   (c) a group of second cooling holes formed in said shell in said discrete region to augment said cooling film and provide convective cooling to said discrete region, wherein said second cooling holes are formed as a plurality of rows from an upstream row to a downstream row so that cooling holes in said downstream row are greater in size than cooling holes in said other rows.

18. The liner of claim 17, wherein the size of said second cooling holes increase in size from said upstream row to said downstream row.

19. The liner of claim 17, wherein the size of said second cooling holes decrease in size from a centerline through said group of second cooling holes circumferentially therefrom.

20. The liner of claim 17, wherein spacing between said second group of cooling holes in a circumferential direction is equal to about 3.0–4.0 hole diameters.

21. The liner of claim 17, wherein spacing between said second group of cooling holes in an axial direction is equal to about 3.0–4.0 diameters.

22. An inner liner for a combustor of a gas turbine engine, comprising:
   (a) a shell having a first end adjacent to an upstream end of said combustor and a second end adjacent to a downstream end of said combustor, said shell including a plurality of panels extending between said first and second ends, wherein a discrete region of n least one of said panels is subject to distress from impingement of hot gases;
   (b) a first cooling slot formed at an upstream end of each said liner panel and a second cooling slot formed at a downstream end of each said liner panel, wherein air flows for providing a cooling film along a hot side of said liner; and
   (c) a group of cooling holes formed in said shell at said discrete region to augment said cooling film and provide convective bore cooling to said discrete region.

* * * * *

UNITED STATES PATENT AND TRADEMARK OFFICE
CERTIFICATE OF CORRECTION

PATENT NO. : 7,086,232 B2 Page 1 of 1
APPLICATION NO. : 10/134283
DATED : August 8, 2006
INVENTOR(S) : George Eric Moertle et al.

It is certified that error appears in the above-identified patent and that said Letters Patent is hereby corrected as shown below:

Column 5, Line 35
Claim 5, line 2: delete "we" and substitute --are--.

Column 5, Line 56
Claim 12, line 2, delete "mid" and substitute --said--.

Column 5, Line 57
Claim 13, line 1: delete "maid" and substitute --said--.

Column 6, Line 51
Claim 22, line 7: delete "n" and substitue --at--.

Signed and Sealed this

Twenty-fourth Day of October, 2006

JON W. DUDAS
*Director of the United States Patent and Trademark Office*